United States Patent [19]

Hersom et al.

[11] 4,431,676

[45] Feb. 14, 1984

[54] VEGETABLE CANNING PROCESS

[75] Inventors: Albert C. Hersom, Beaconsfield; Vernon Gibbs, Southall, both of Great Britain

[73] Assignee: Societe d'Assistance Technique pour Produits Nestle S.A., Lausanne, Switzerland

[21] Appl. No.: 452,638

[22] Filed: Dec. 23, 1982

[30] Foreign Application Priority Data

Feb. 9, 1982 [GB] United Kingdom ................. 8203763

[51] Int. Cl.³ .......................... B65B 55/12; A23L 3/00
[52] U.S. Cl. ..................................... 426/131; 426/402; 426/478; 426/106; 426/489; 426/426; 426/637
[58] Field of Search ............... 426/400, 402, 407, 412, 426/404, 401, 325, 637, 486, 399, 426, 131, 478, 489, 324, 106, 615, 321

[56] References Cited

U.S. PATENT DOCUMENTS

| | | | |
|---|---|---|---|
| 1,236,382 | 8/1917 | Epler | 426/489 |
| 1,365,673 | 1/1921 | Fenn | 426/402 |
| 1,380,489 | 6/1921 | McLaughlin | 426/402 |
| 1,934,810 | 5/1930 | Mazzola | 426/402 |
| 1,986,543 | 1/1935 | Stansbury | 426/637 |
| 2,254,580 | 9/1941 | Perlman | 426/402 |
| 2,506,793 | 5/1950 | Kalamar | 426/262 |
| 2,594,308 | 4/1952 | Heisler et al. | 426/489 |
| 2,630,958 | 3/1953 | Hohl | 426/402 |
| 2,797,166 | 6/1957 | Siciliano et al. | 426/426 |
| 2,973,276 | 2/1961 | Cyr | 426/324 |
| 3,086,868 | 4/1963 | Keifer | 426/486 |
| 3,689,282 | 9/1972 | Feinberg | 426/426 |
| 3,773,527 | 11/1973 | Ruggerone | 426/637 |
| 3,843,810 | 10/1974 | Fehmerling | 426/615 |
| 3,904,774 | 9/1975 | Dymsza | 426/426 |
| 4,014,153 | 3/1977 | Wilson | 53/434 |
| 4,097,612 | 6/1978 | Powrie | 426/325 |
| 4,218,484 | 8/1980 | Blanchaud | 426/615 |

FOREIGN PATENT DOCUMENTS

| | | | |
|---|---|---|---|
| 122422 | 3/1920 | United Kingdom | 426/489 |
| 463830 | 4/1937 | United Kingdom | 426/489 |

*Primary Examiner*—Steven L. Weinstein
*Attorney, Agent, or Firm*—Vogt & O'Donnell

[57] ABSTRACT

A process for canning vegetables characterized in that vegetables in the form of pieces of thin cross-section are treated osmotically to remove liquid, then pressed mechanically to remove further liquid, filled into cans and sauced, after which the cans are sealed and sterilized.

8 Claims, No Drawings

VEGETABLE CANNING PROCESS

The present invention relates to a process for the canning of vegetables in the form of pieces of thin cross-section.

Potatoes in the form of small pieces such as dice, platelets, thin slices or fragments as required in dishes such as Rösti, Hash Browns or Fast Fries are normally canned as a solid pack. However, the following difficulties arise in canning and using a solid pack of potatoes prepared by these conventional methods:

1. During the handling and canning operation enzymatic browning takes place as well as darkening due to oxidation which occurs because air is occluded with solids in the can.
2. Excessive "spitting" occurs during the frying of the canned product by the consumer.
3. It is difficult to obtain an adequate heat penetration into the can of solid packed potato during the sterilisation process.
4. It is difficult to fill an adequate weight of potato into the can on high speed fillers.

We have found that if a certain amount of liquid is removed from the prepared vegetable pieces by the combined use of osmosis and mechanical pressing before canning, the volume of the vegetable pieces is reduced to such an extent that an adequate weight of vegetable solids may be filled into the can readily at high speeds using conventional pocket type fillers. By carrying out this preliminary removal of liquid from the vegetable pieces, it is unnecessary to use a more complex and slower "stuffing" type filler in order to obtain the required weight of potato solids in the can volume available.

Accordingly, the present invention provides a process for canning vegetables characterised in that vegetables in the form of pieces of thin cross-section are treated osmotically to remove liquid, then pressed mechanically to remove further liquid, filled into cans and sauced, after which the cans are sealed and sterilised.

The vegetables which are canned by the process of this invention are in the form of small pieces of various shapes such as dice, platelets, thin slices or fragments. The vegetables may be root vegetables such as potatoes or carrots or other high moisture ingredients such as mushrooms. The process is particularly advantageous for potato pieces which are to be used in dishes such as Rösti, Hash Browns or Fast Fries.

The osmotic treatment of the vegetable pieces is conveniently carried out by immersing them for a few minutes in a solution of a salt suitable for human consumption such as sodium chloride or potassium chloride. The concentration of the salt is conveniently at least 10% and preferably from 20% on a weight/weight basis up to the saturation point. This treatment induces "bleeding" of the vegetable pieces by osmosis and the time of the treatment is preferably sufficiently short that the salt uptake into the vegetable is minimal. The amount of liquid removed by this treatment may be controlled by varying the time of the immersion and generally the amount of liquid removed is up to 15% by weight and preferably from 5 to 10% by weight based on the weight of the vegetable pieces.

After treatment with the salt solution, excess salt solution is preferably removed from the vegetable pieces conveniently by draining in a de-watering reel.

The vegetable pieces are then pressed mechanically, for example, by a continuous screw press or a similar device capable of applying mechanical pressure. The amount of liquid removed at this stage may be up to 40% by weight and preferably from 20 to 35% by weight based on the weight of the vegetable pieces. By controlling the time and pressure during the pressing operation, the amount of liquid removed from the vegetable pieces may be varied.

The pressed solids are then filled into cans, for example, at high speed using a conventional pocket filler and then sauced in a second stage operation, for example, by means of a "syruper" filler. The sauce used at this stage may be the liquid removed from the vegetable pieces by the pressing operation, or it may be freshly prepared to give the desired effects. The amount of sauce added depends on the extent of the pressing operation and varies with the nature of the product. For Rösti and Hash Browns it is from 20% to 50% by weight and preferably from 25% to 45% by weight based on the weight of the pressed vegetable pieces.

Afterwards the cans are sealed, for example, with steam flow closure and then sterilised.

In the process of the present invention, when the pressed vegetable pieces are sauced, the voids between the vegetable pieces are filled so that air is excluded from the can. If, in addition, the method of sealing the can is designed to eliminate air in the headspace, such as steam flow closure, an adequate vacuum is obtained. The absence of air prevents oxidation and darkening of the vegetable pieces.

The possibility of varying the amount of water from the vegetable pieces during the osmotic treatment and the pressing operation enables the moisture content to be controlled. This is extremely valuable in determining the quality of the finished pack, particularly in respect of the frying properties of potatoes since the regulation and control of the water content reduces "spitting" during frying.

During sterilisation of the sealed can, the heat penetration into the product which is a mixture of solid and liquid component, is more rapid than when a solid fill only is used since convective heating rather than conductive heating occurs. Also, during sterilisation, the liquor is absorbed into the pressed pieces of vegetables causing them to expand and fill the can completely. Thus, provided suitable measures are taken to prevent enzymatic browning during the early stages of the process, a solid pack of excellent colour is obtained with no residual headspace.

The process is further illustrated by the following example.

EXAMPLE

Diced potatoes were immersed for 5 minutes in a 25% weight/weight solution of sodium chloride containing 400 ppm sulphur dioxide. This induced "bleeding" of 8% by weight of liquid based on the weight of the diced potato. Excess brine was removed by draining in a de-watering reel and the diced potatoes were then fed to a continuous screw press where 30% by weight of liquid based on the weight of diced potatoes was removed. The pressed solids were filled at high speed on a conventional pocket filler and sauced in a second stage operation by means of a "syruper." The sauce used was obtained from the liquid removed by the pressing operation and the amount added was 35% by weight based on the weight of the diced potatoes.

Afterwards the cans were sealed by steam flow closure and finally sterilised.

We claim:

1. A process for canning vegetables comprising:
   (a) osmotically treating vegetables in the form of thin cross sections to remove up to 15% by weight of liquid based on the weight of the vegetable pieces;
   (b) mechanically pressing the osmotically treated vegetable pieces to remove up to 40% by weight of further liquid based on the weight of the vegetable pieces;
   (c) filling the pressed pieces into cans and adding sauce; and then
   (d) sealing and sterilizing the cans wherein the combined said amount of liquid removed in steps (a) and (b) is sufficient to reduce the volume of the vegetable pieces to such an extent that they may be readily filled into the cans at high speeds.

2. A process according to claim 1, wherein the vegetables are potatoes.

3. A process according to claim 1, wherein the osmotic treatment of the vegetable pieces is carried out by immersing them in a solution of sodium chloride having a concentration of from 10% on a weight/weight basis up to the saturation point for a period of time sufficient to remove from 5 to 10% by weight of liquid based on the weight of the vegetable pieces.

4. A process according to claim 3, wherein after the osmotic treatment, excess sodium chloride solution is removed from the vegetable pieces.

5. A process according to claim 1, wherein the vegetable pieces are pressed mechanically until the amount of liquid removed is from 20 to 35% by weight based on the weight of the vegetable pieces.

6. A process according to claim 1, wherein the pressed vegetable pieces are fitted into cans at high speed using a conventional pocket filler and the sauce is added in a second stage operation.

7. A process according to claim 1, wherein the cans are sealed by steam flow closure.

8. A canned vegetable product prepared by the process of claim 1.

* * * * *